US006604294B1

(12) United States Patent  
Farley

(10) Patent No.: US 6,604,294 B1
(45) Date of Patent: Aug. 12, 2003

(54) ADJUSTABLE ANGLE CARPENTRY APPARATUS

(76) Inventor: Kent Farley, 505-B Reed Rd., Zillah, WA (US) 98953

( * ) Notice: Subject to any disclaimer, the term of this patent is extended or adjusted under 35 U.S.C. 154(b) by 0 days.

(21) Appl. No.: 09/998,457

(22) Filed: Nov. 29, 2001

(51) Int. Cl.[7] .................................................. B43L 7/10
(52) U.S. Cl. ......................... 33/455; 33/27.03; 33/500
(58) Field of Search .......................... 33/452, 453, 455, 33/456, 465, 468, 469, 471, 474, 479, 418, 419, 427, 27.02, 27.03, 385, 400, 500

(56) References Cited

U.S. PATENT DOCUMENTS

| 451,810   | A | * | 5/1891   | Cowgill ........................ 33/455 |
| 518,685   | A | * | 4/1894   | Bartley ........................ 33/455 |
| 678,005   | A | * | 7/1901   | Myers ........................ 33/27.03 |
| 797,453   | A | * | 8/1905   | Nagel ........................... 33/455 |
| 821,374   | A | * | 5/1906   | Parks ........................... 33/455 |
| 925,807   | A | * | 6/1909   | Green ........................... 33/455 |
| 956,356   | A | * | 4/1910   | Humbert ........................ 33/455 |
| 1,454,782 | A | * | 5/1923   | Wimmer ..................... 33/27.03 |
| 1,460,093 | A | * | 6/1923   | Costovici ................... 33/27.03 |
| 2,553,812 | A | * | 5/1951   | Cohen ........................ 33/27.03 |
| 2,866,270 | A | * | 12/1958  | Johnson et al. ............... 33/455 |
| 3,392,449 | A | * | 7/1968   | Tierney ..................... 33/27.03 |
| 3,562,919 | A | * | 2/1971   | Green ........................... 33/456 |
| 4,527,341 | A | * | 7/1985   | Schön ......................... 33/25.1 |
| 4,724,007 | A |   | 2/1988   | Hathaway ................... 33/465 |
| 5,392,525 | A |   | 2/1995   | Chow ........................... 33/465 |
| 5,438,761 | A |   | 8/1995   | Krumszyn et al. ............. 33/451 |
| 5,687,628 | A |   | 11/1997  | Liao ............................. 83/745 |

OTHER PUBLICATIONS

<www.stanleytoolcollector.com/InstShts/AngleDivider30/AngleDivider30–1.html> and <www.stanleytoolcollector.com/InstShts/AngleDivider30/Angle Divider30–2.html> (both downloaded Aug. 6, 2002).

Five photographs of "Angle Divider No. 30," as manufactured by Stanley Tools (dated Aug. 5, 2002).

* cited by examiner

Primary Examiner—G. Bradley Bennett
(74) Attorney, Agent, or Firm—Stratton Ballew PLLC

(57) ABSTRACT

An adjustable carpenter's square for the quick and reproducible measurement of angles and radii. The adjustable carpenter's square includes a center bar that includes a set of indicia. The indicia are any appropriate set of graduations, which may include numerical notations. A indicator slide is receivable onto the center bar. The indicator slide includes a first and second slide strut pivot. A first and second strut attach to the indicator slide. A first wing attaches to the center bar and the first strut. The first wing also includes a first wing strut pivot. The first wing strut pivot hingably connects the first wing to the first strut. The first wing strut pivot attaches to the first strut. A second wing attaches to the center bar and the second strut. The second wing includes a second wing strut pivot. The second wing strut pivot hingably connects the second wing to the second strut. The first and second wings pivotably connect to the center bar. The indicator slide connects to the first and second struts. A measured relation is formed between the first wing with the second wing. The position of the indicator slide on the center bar is relatable to the measured relation by way of the set of indicia displayed on the center bar. The measured relation can include such values as: angles, pitches, radii, diameters, distances, segments, arcs and chords.

12 Claims, 13 Drawing Sheets

ADJUSTABLE ANGLE CARPENTRY APPARATUS

TECHNICAL FIELD

The invention relates to an adjustable apparatus for the quick and accurate measurement of angles and distances, and more particularly to a carpenter's type of adjustable square that provides incrementally reproducible angular and linear measurements.

BACKGROUND OF THE INVENTION

Carpentry squares have long been employed as an aid in construction and in craft. Professional carpenters, builders, wood workers, brick layers and masons are but a few trades that require a carpenters's type of square for checking and measuring work materials. Besides professional trades persons, hobbyists and "do-it-yourselfers" also use squares in a wide variety of applications in often encountered situations, each requiring the reliable and quick checking, measurement or establishment of an angle.

The standard and well known carpenter's square is a tool that typically has either a triangular or "L" shape. Conventionally, two metal, wood or plastic elements or "legs" are joined at a right angle (90°) to form the tool. The legs of the "L" can be connected by a third leg to form the triangular alternative, often referred to as a "speed square."

There have been many improvements made to the carpenter's square, often to make the square into a multipurpose tool and to aid in the measurement of angles, other than the 90° angle incorporated within the conventional form.

U.S. Pat. No. 5,392,525 is one such improved device, which is employed as a technical drawing tool. The drawing tool includes a circular protrusion that displays the angular relationship between two connected rulers. Though potentially useful for drawing and drafting, the angle increments are difficult to read, especially if the device is employed for actual, field carpentry work or the like, rather than on a drafting or drawing table.

U.S. Pat. No. 5,687,628 shows a guiding device for wood cutting that includes a set of guides that pivot from a common point. However, the guide lacks the ability to be set to a specific angle with precision, with out the aid of an additional angular measuring device.

U.S. Pat. No. 6,105,267 discloses an adjustable carpentry angle apparatus that includes two legs with an interconnecting link. Again, the adjustment to specific needed angles cannot be achieved without an additional angle measuring device to verify or select the desired angle between the two legs.

An adjustable apparatus is needed that can accurately reproduce angles needed in carpentry and more generally for construction. This tool must be is easily adjusted with reproducible precision, and still able to withstands the rigors of construction work.

SUMMARY OF INVENTION

The present invention provides an adjustable carpenter's square for the quick and reproducible measurement of angles and distances, such as radii. The adjustable carpenter's square includes a center bar. The center bar has a grip end and a wing end. Along the center bar, a set of indicia are inscribed. The indicia are any appropriate set of graduations upon the center bar, which may include numerical notations. A indicator slide is receivable onto the center bar. The indicator slide includes a first slide strut pivot and a second slide strut pivot.

A first strut and a second strut attach to the indicator slide. The first strut has a first wing strut end and a first slide strut end. The second strut has a second wing strut end and a second slide strut end.

A first wing attaches to the center bar and the first strut. The first wing has a first wing tip and a first center bar end. The first wing also includes a first wing strut pivot positioned between the first wing tip and the first center bar end. The first wing strut pivot hingably connects the first wing to the first strut. The first wing strut pivot attaches to the first strut proximate to the first wing strut end of the first strut.

A second wing attaches to the center bar and the second strut. Similar to the first wing, the second wing has a second wing tip and a second center bar end. The second wing includes a second wing strut pivot positioned between the second wing tip and the second center bar end. The second wing strut pivot hingably connects the second wing to the second strut. The second wing strut pivotably attaches to the second strut proximate to the second wing strut end of the second strut.

The first wing pivotably connects to the center bar at a first wing hinge. The first wing hinge is proximate to the first center bar end of the first wing, and the first wing hinge is proximate to the wing end of the center bar.

The second wing pivotably connects to the center bar at a second wing hinge. The second wing hinge is proximate to the second center bar end of the second wing, and the second wing hinge proximate to the wing end of the center bar.

The indicator slide includes a first slide strut pivot and a second slide strut pivot. The first slide strut pivot on the indicator slide connects to the first strut proximate to the first slide strut end of the first strut. The second slide strut pivot on the indicator slide connected to the second strut proximate to the second slide strut end of the second strut.

A measured relation is formed between the first wing with the second wing. The position of the indicator slide on the center bar is relatable to the measured relation by way of the set of indicia displayed on the center bar. The indicator slide directly corresponds to the measured relation, formed between the first wing and the second wing. Additionally, the indicator slide can be employed to select the measured relation desired. The measured relation can include such values as: angles, pitches, radii, diameters, distances, segments, arcs and chords.

In a preferred alternative of the present invention, the user can lock the indicator slide in any position along the center bar. The locked-in measured relation can then be translated and reproduced, as desired.

The invention will be better understood by reference to the following detailed description taken in conjunction with the accompanying drawings.

DETAILED DESCRIPTION OF SPECIFIC EMBODIMENTS

Figure 1:
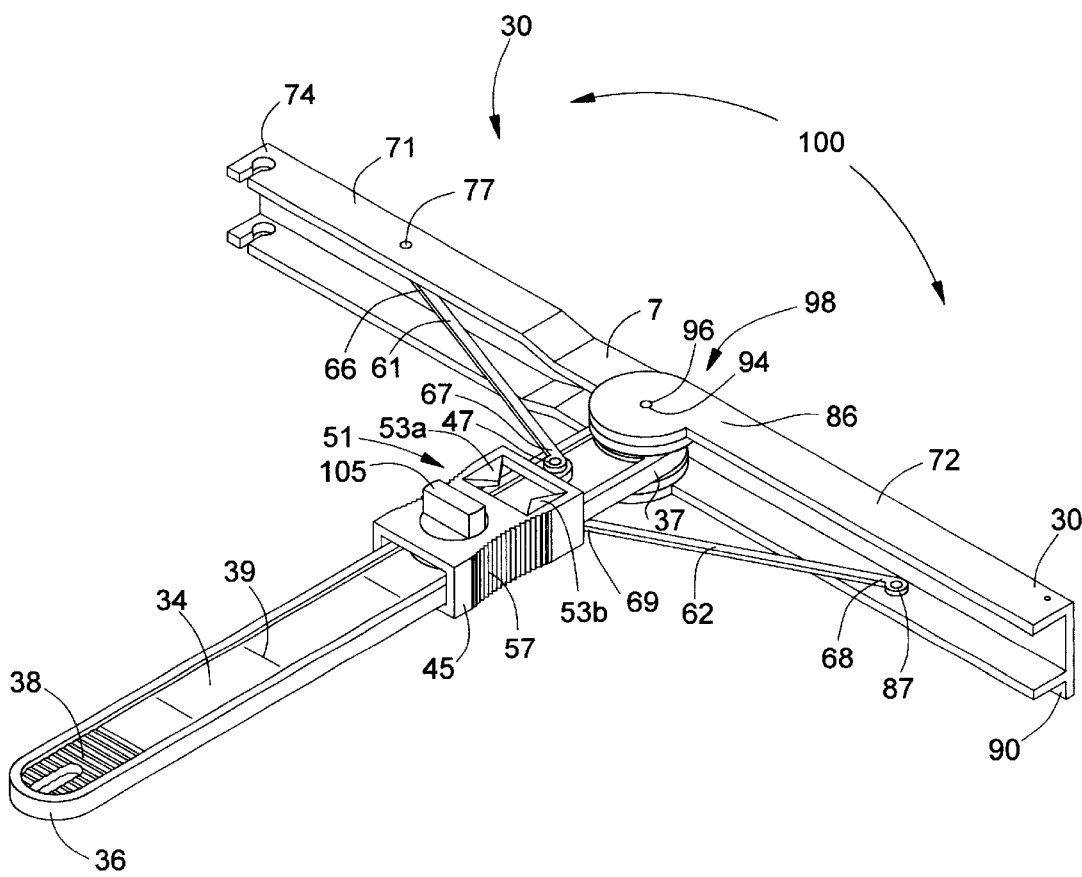
FIG. 1 is a perspective view of an adjustable carpenter's square, according to an embodiment of the invention.

The invention provides an adjustable square that quickly and accurately measures and reproduces angles. The adjustable square is referred to herein as a "carpenter's" square, being that carpenter's often use such a device in their occupations. However, the present invention is considered as a potentially useful tool for a variety of applications or occupations besides carpentry, including: masonry, excavation, landscaping, construction and drafting, to name but a few.

The adjustable square 30 and portions of the adjustable square are shown in FIGS. 1 through 13. As detailed in FIGS. 1 and 2, the adjustable square includes a center bar 33. Being substantially flat in the preferred embodiment, the center bar of the adjustable square includes a top face 34 and a bottom face 35. The center bar also has a grip end 36 opposite a wing end 37. The center bar also preferably includes a thumb grip 38 located proximate to the grip end of the center bar. The thumb grip can be a set of groves, or alternatively a set of ridges or any other pattern resulting in a surface roughness that would aid a user in gripping the center bar with their fingers.

Along the top face 34 of the center bar 33, a set of "angle indicia" 39 are preferably inscribed. The angle indicia are any appropriate set of graduations upon the top face, which may as is most preferred, include numerical notations. As shown in FIGS. 4 through 7, the angle indicia begin near the grip end 36 of the center bar and increase toward the wing end 37. These angles can be selected as any that are typically employed in carpentry work, or whatever use employed by the adjustable square 30. Angles including 45°, 90°, 180° are most preferred with the addition of graduations also included in the preferred embodiment as shown in FIGS. 1 and 2, to aid in the selection of other angles, as desired by the user.

Figure 2:
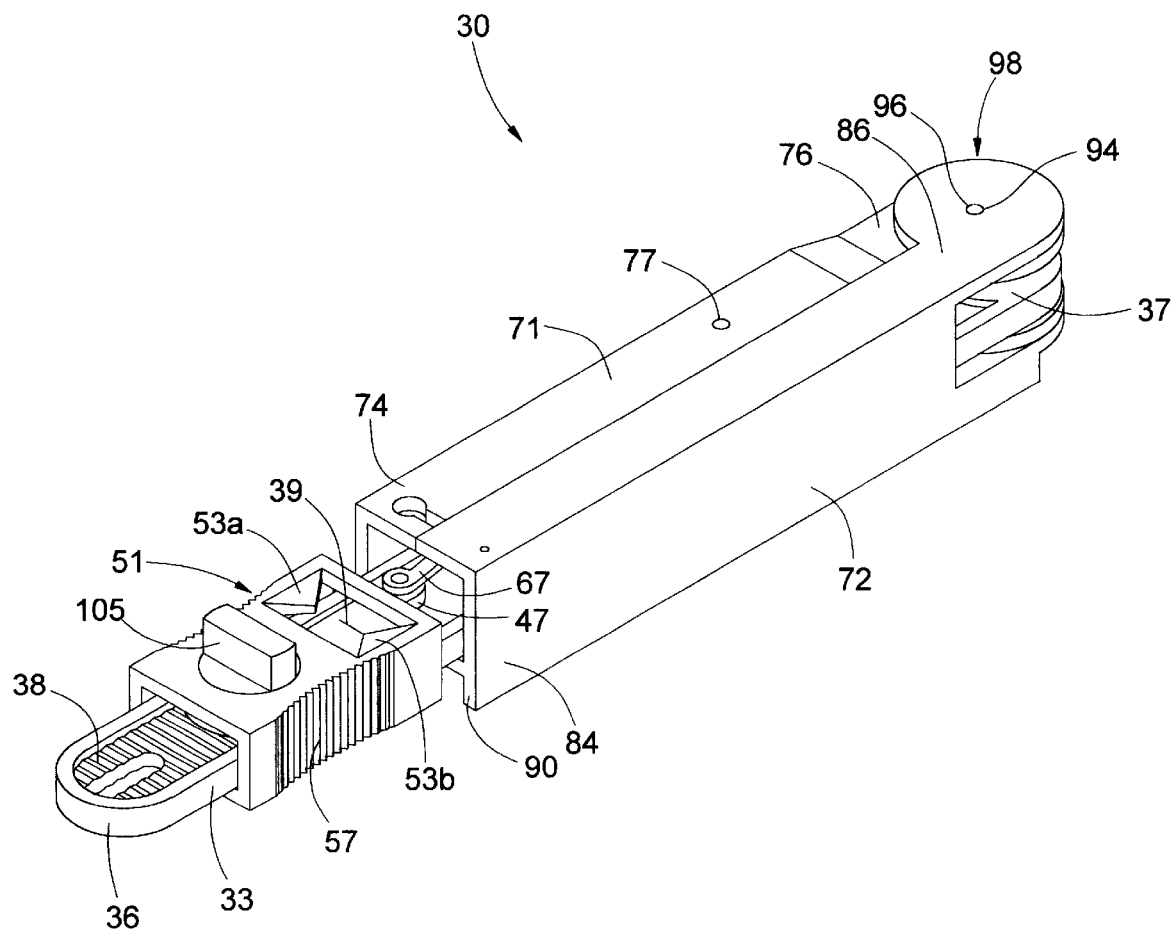
FIG. 2 is a perspective view of an adjustable carpenter's square, according to an embodiment of the invention.
Figure 10:
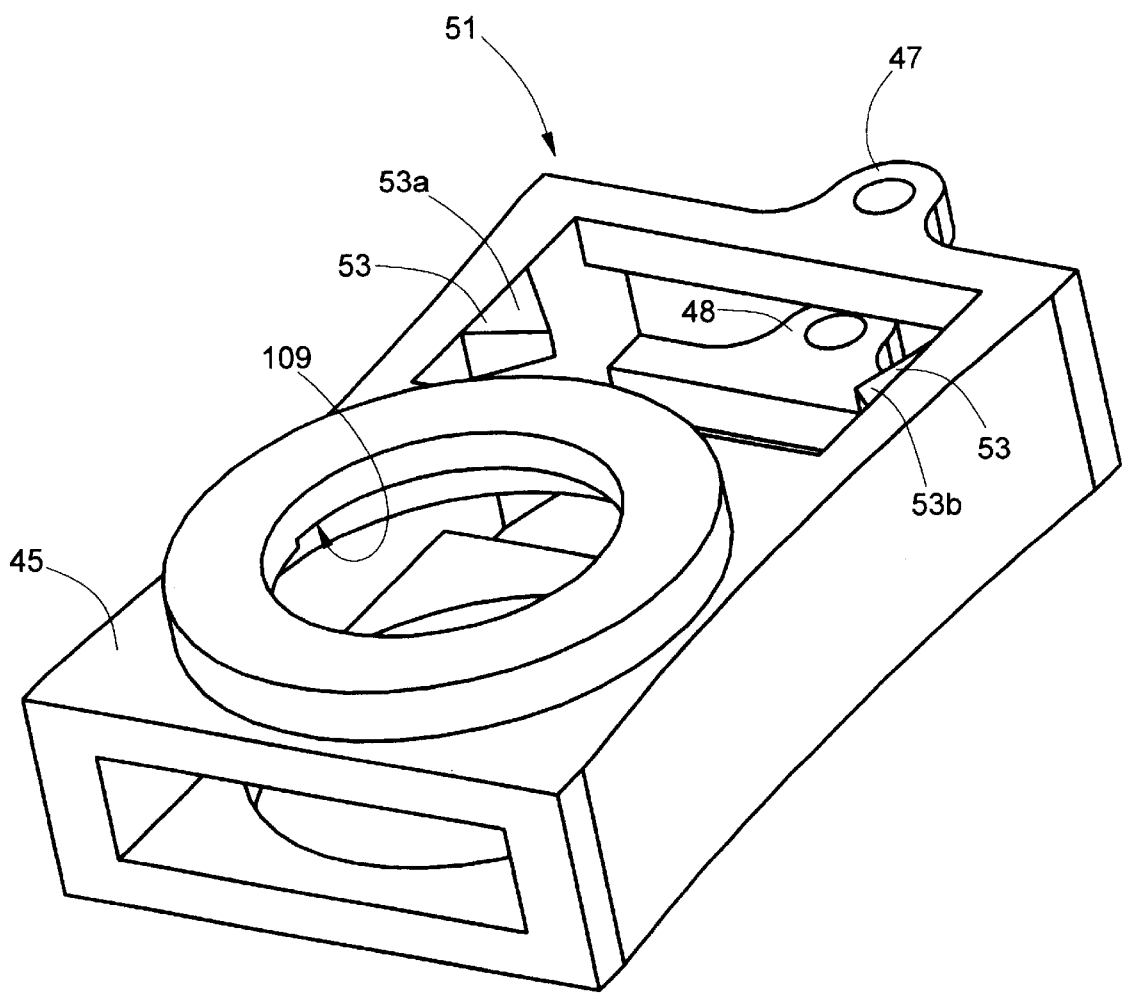
FIG. 10 is a perspective view of a portion of an adjustable carpenter's square, according to an embodiment of the invention.
Figure 11:
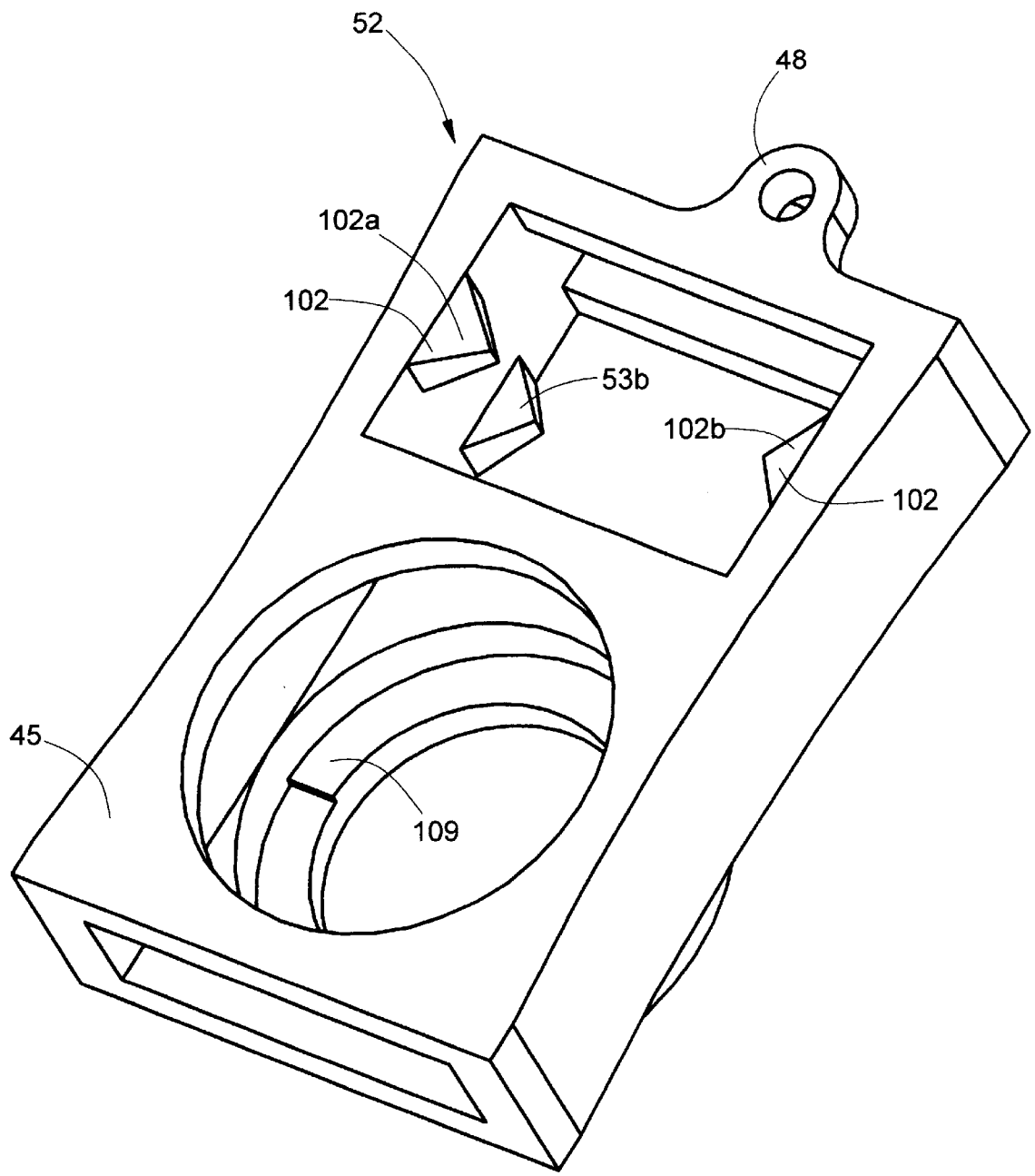
FIG. 11 is a perspective view of a portion of an adjustable carpenter's square, according to an embodiment of the invention.

As shown in FIGS. 1 and 2, an indicator slide 45 receivable onto the center bar 33. The indicator slide is movable along the center bar 33. FIGS. 10 and 11 detail the indicator slide 45. The indicator slide includes a first slide strut pivot 47 and a second slide strut pivot 48. Alternatively, the first slide strut pivot and the second slide strut pivot can be combined in a common slide strut pivot. However, for the smoothest action of the adjustable square, the positioning of the slide strut pivots on opposite sides of the indicator slide is most preferred.

The indicator slide 45 preferably includes a top view window 51 and a bottom view window 52. The top view window is an opening in the indicator slide that shows the angle indicia 39 on the top face 34 of the center bar 33, beneath. The bottom view window is open to the bottom face 35 of the center bar. The top view window and the bottom view window are preferably openings, but may be filled with a clear or substantially clear material, such as a plastic or glass.

In a preferred embodiment, the top view window 51 includes a selection arrow 53. The selection arrow is a pointed extension of the indicator slide 45 into the top view window that gives the user precision in the selecting of the angle indicia 39 displayed within the top view window. Most preferably, as shown in FIGS. 1, 2, 10 and 11 the selection arrow includes a first selection arrow 53a and a second selection arrow 53b, one each extending from opposite sides of the top view window. Alternatively, especially if the top view window includes a clear material, the selection arrow can be augmented or replaced by a selection line, a crosshair, or some similar indicator. As an additional alternative, a digital, LED, or similar display could be employed instead of the top view window, to precisely indicate the position of the indicator slide on the center bar 33.

Figure 6:
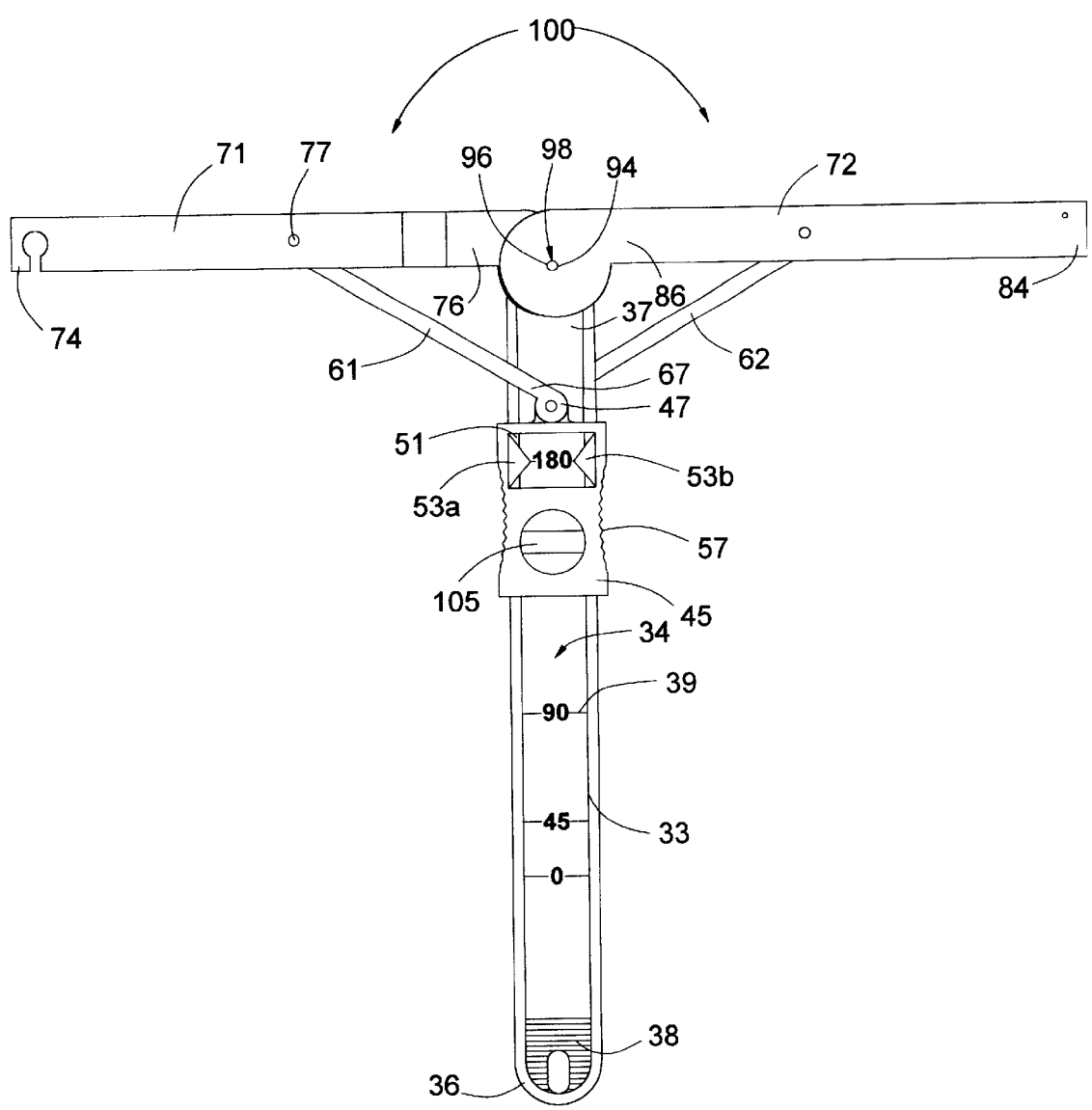
FIG. 6 is a plan view of an adjustable carpenter's square, according to an embodiment of the invention.
Figure 7:
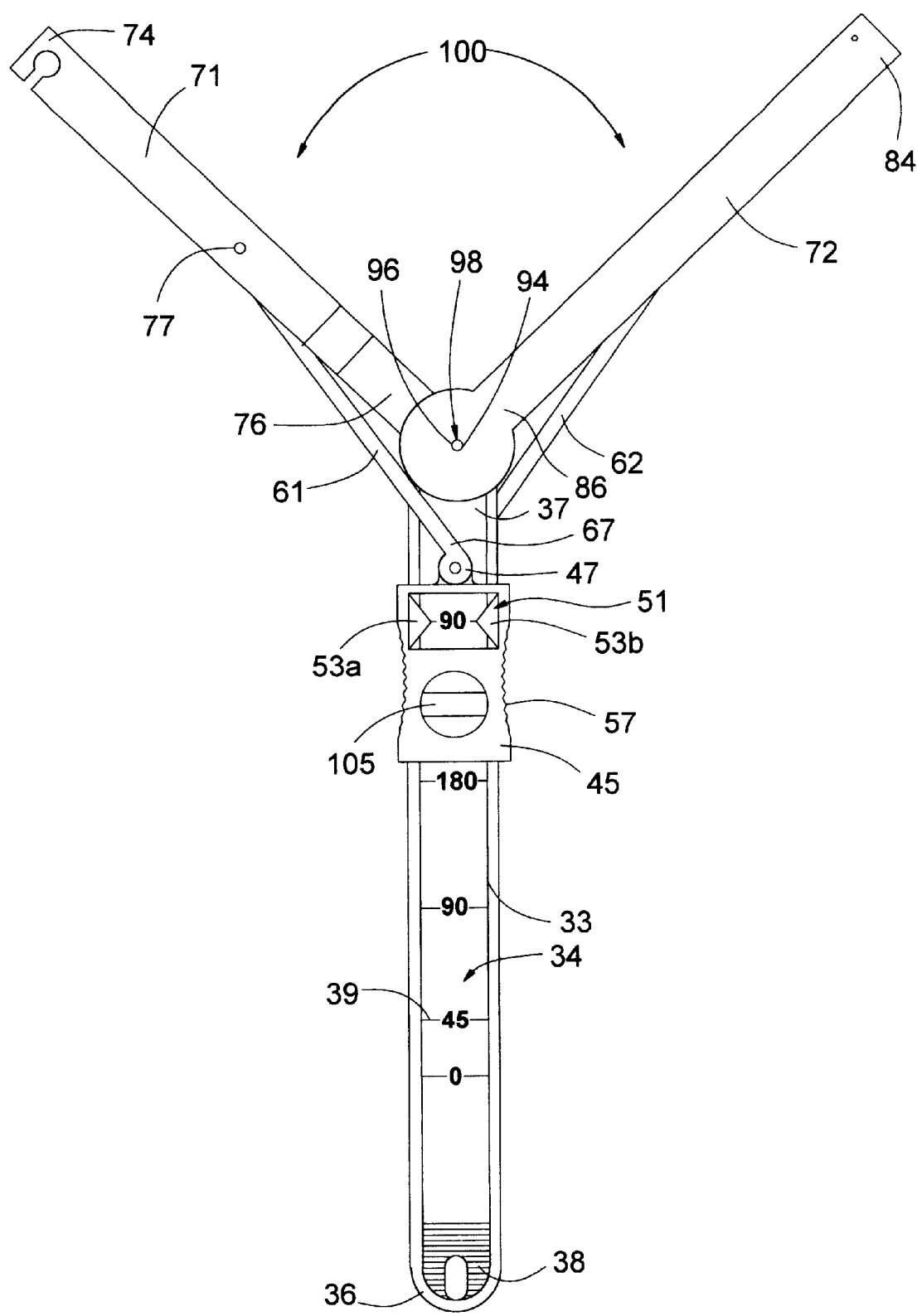
FIG. 7 is a plan view of an adjustable carpenter's square, according to an embodiment of the invention.
Figure 8:
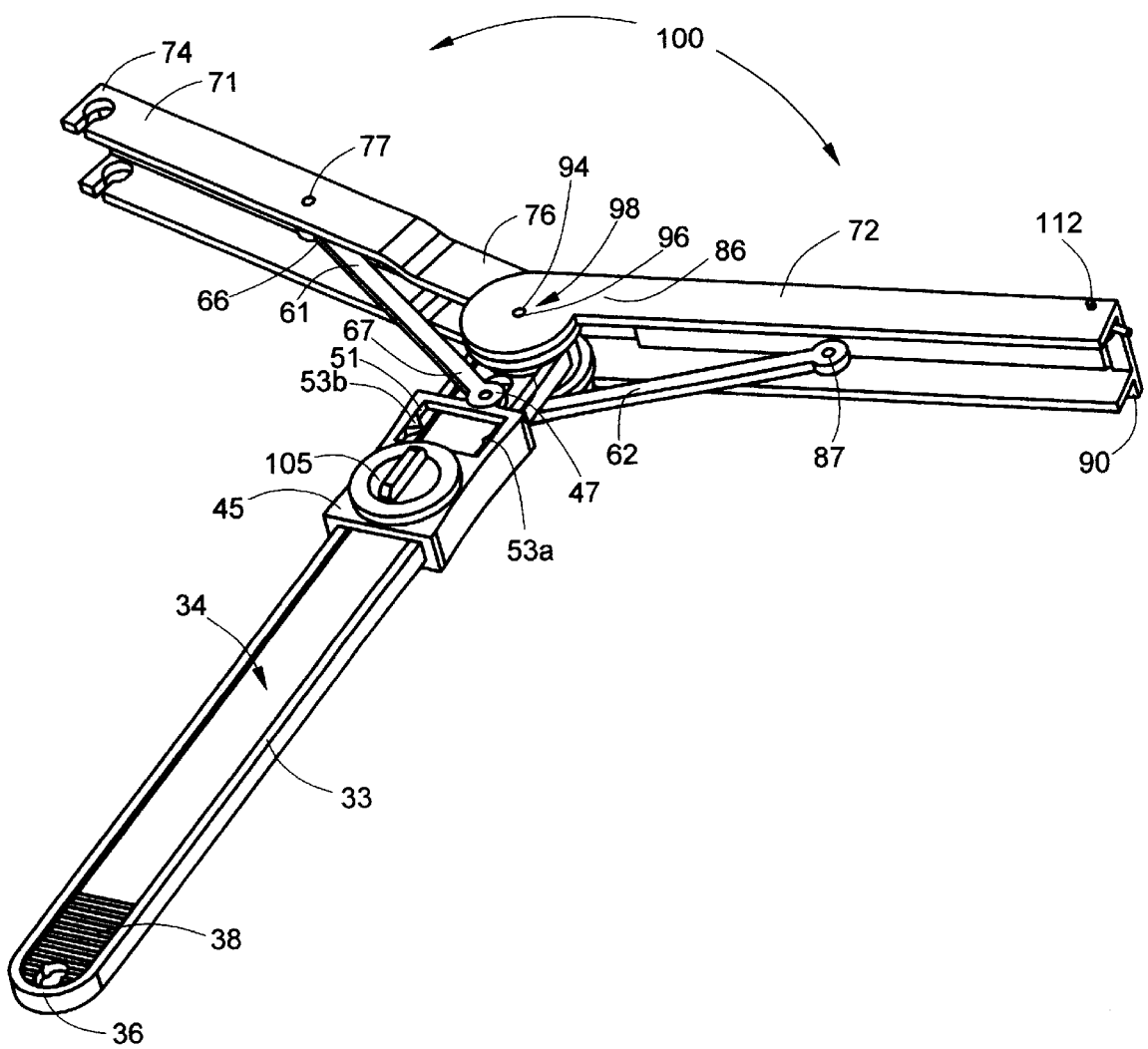
FIG. 8 is a perspective view of an adjustable carpenter's square, according to an embodiment of the invention.
Figure 9:
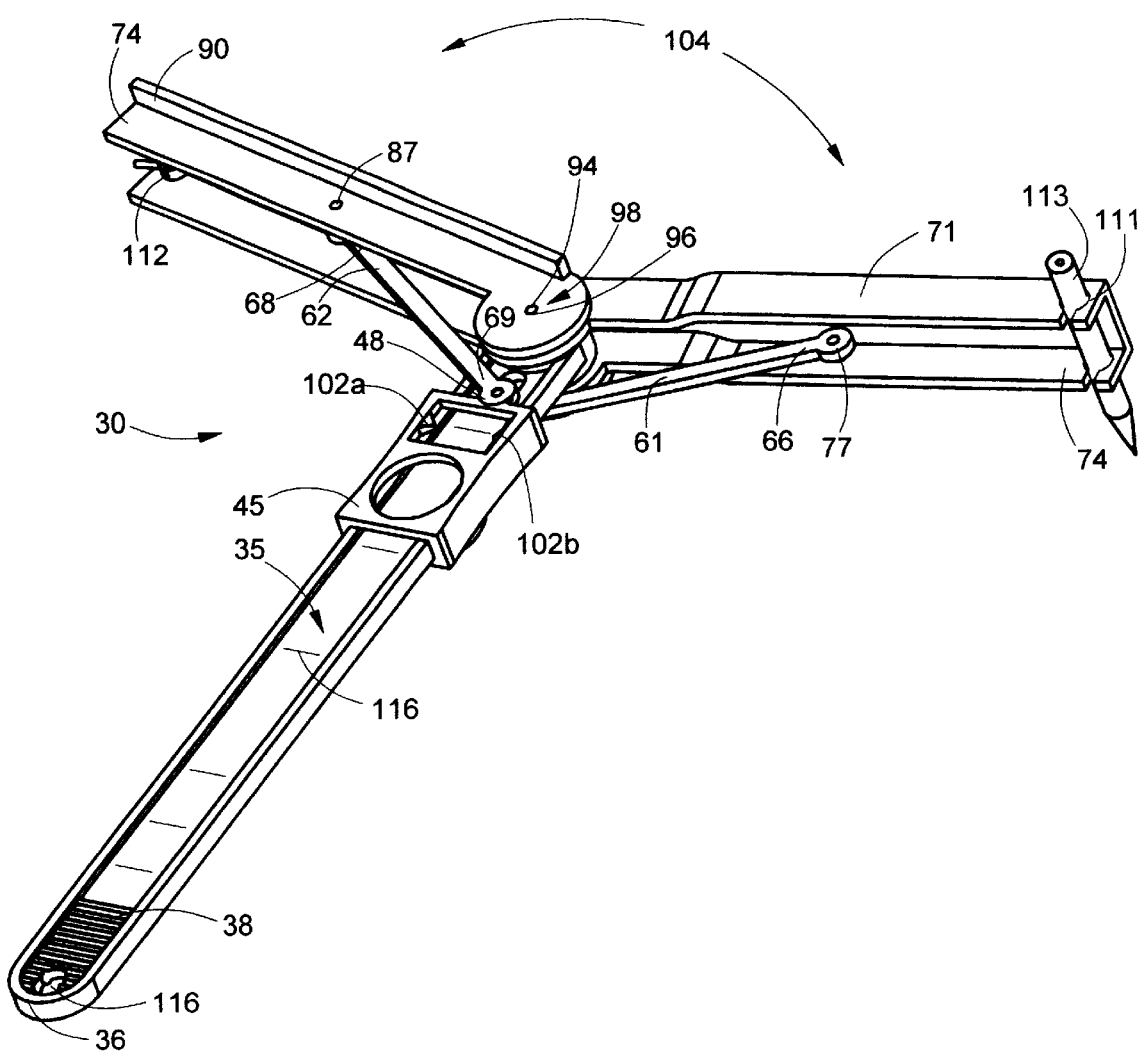
FIG. 9 is a perspective view of an adjustable carpenter's square, according to an embodiment of the invention.

The indicator slide moves up and down the center bar, as shown in FIGS. 1 through 9. As shown in FIGS. 1 through 7, a finger grips 57 are preferably included in the indicator slide to aid in griping the indicator slide by the user. In an alternative preferred embodiment of the present invention, as shown in FIGS. 8 and 9, the finger grips can be omitted, to provide for easier manufacturing of the indicator slide.

As also shown in FIG. 8, a first strut 61 attaches to the indicator slide 45 at the first slide strut pivot. As shown in FIG. 9, a second strut 62 attaches to the indicator slide at the second slide strut pivot 48. The first strut has a first wing strut end 66, opposing a first slide strut end 67. The first slide strut pivot is proximate to the first slide strut end of the first strut. Similarly, second strut has a second wing strut end 68, opposing a second slide strut end 69. The second slide strut pivot is proximate to the second slide strut end of the second strut. As discussed above, the first slide strut pivot and the second slide strut pivot can alternatively be combined to form the first common slide strut pivot. As an additional alternative, the second slide strut pivot can be included on the same side of the indicator slide as, but separated from, the first slide strut pivot.

As shown in FIGS. 1 and 8, a first wing 71 and a second wing 72 each attach to the wing end 37 of the center bar 33. The first strut 61 connects to the first wing. The first wing has a first wing tip 74 and a first center bar end 76. The first wing also includes a first wing strut pivot 77 positioned between the first wing tip and the center bar end. The first wing strut pivot hingably connects the first wing to the first strut. The first wing strut pivot is located on the first strut proximate to the first wing strut end 66 of the first strut.

The second strut 62 connects to the second wing 72. The second wing has a second wing tip 84 and a second center bar end 86. The second wing includes a second wing strut pivot 87 positioned between the second wing tip and the second center bar end. The second wing strut pivot hingably connects the second wing to the second strut. The second wing strut pivot is located on the second strut proximate to the second wing strut end 68 of the second strut. Also, the first wing and the second wing can include ledges onto which the wings can abut against an object. This is especially useful when using the present invention for angle measurement. In a preferred embodiment, only the second wing includes a ledge 90, as detailed in FIG. 9.

The first wing 71 and the second wing 72 are preferably made from a strong and non-bendable material, such as metal, wood, or as preferred, a plastic. The most preferred plastic for fabricating the wings, the center bar 33 and the indicator slide 45, is an injection molded resin polymer that is most preferably reinforced with a fiberglass filling. Glass-filled "6/6 nylon" or glass-filled polycarbonate are most preferred alternatives, considered equivalent for most purposes considered. Mineral reenforcement is also considered, as well as employing polystyrene, ABS, TPE, PVC and polypropylene, which are examples of compounds used by those skilled in the manufacture of such components.

Alternatively, the ledge 90 can be a separate insert into the second wing 72. For this embodiment of the present invention, the ledge is preferably made from a metal material, such as a stainless steel to give the user a sharp edge for scribing and marking. Most preferably however, as shown in FIG. 9, the ledge is simply an extension from the wing, and made of the same material as the wing.

The first wing 71 pivotally connects to the center bar 33 at a first wing hinge 94. Similarly, the second wing 72 pivotally connects to the center bar at a second wing hinge 96. The first wing hinge and the second wing hinge are both proximate to the wing end 37 of the center bar. Preferably, the first wing hinge and the second wing hinge are combined on a common wing pivot 98, as shown in FIGS. 1, through 9. On the center bar, the first wing hinge and the second wing hinge are located proximate to the wing end of the center bar. Alternatively, the first wing hinge and the second wing hinge can be separate hinges on the wing end of the center bar. In the preferred alternative of the present invention, the first wing hinge and the second wing hinge are combined into a common wing hinge, where both the first wing and the second wing share the same pivot point on the center bar.

For the first wing 71, the first wing hinge 94 is proximate to the first center bar end 76 of the first wing. Likewise, for the second wing 72, the second wing hinge 96 is proximate to the second center bar end 86 of the second wing.

Figure 3:
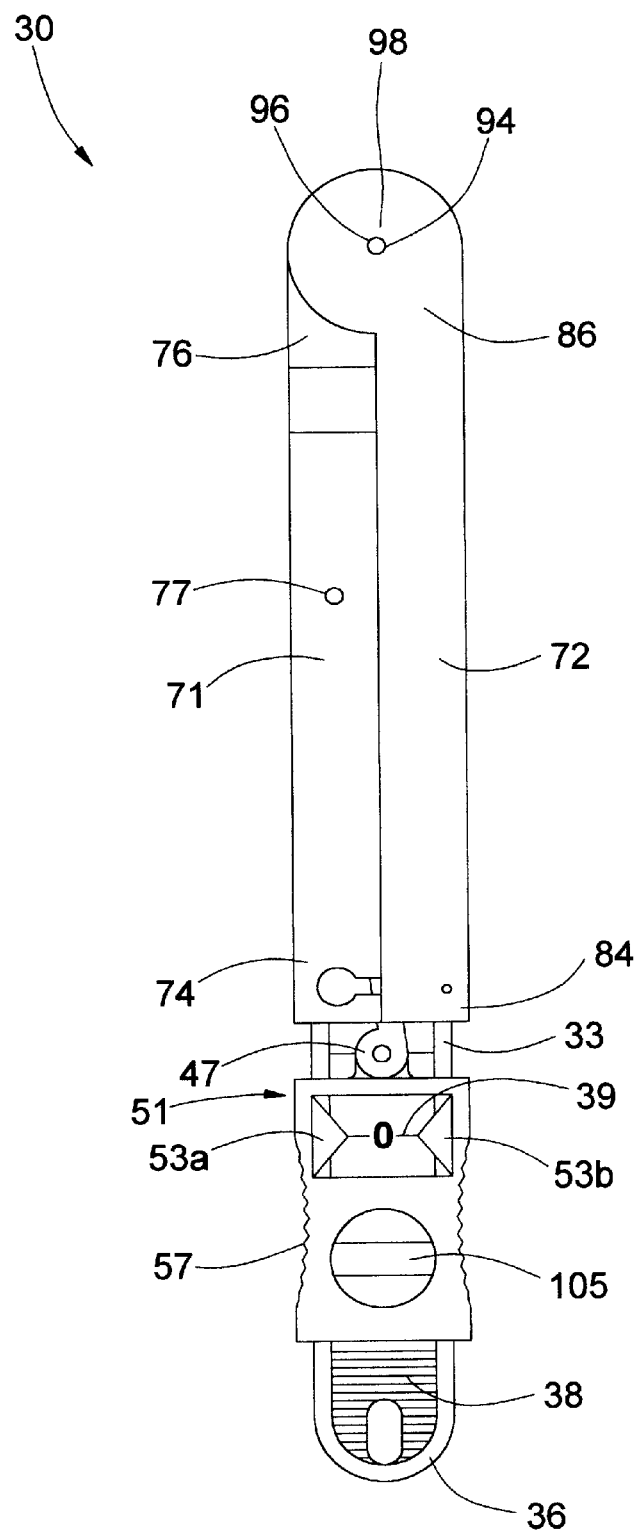
FIG. 3 is a plan view of an adjustable carpenter's square, according to an embodiment of the invention.
Figure 4:
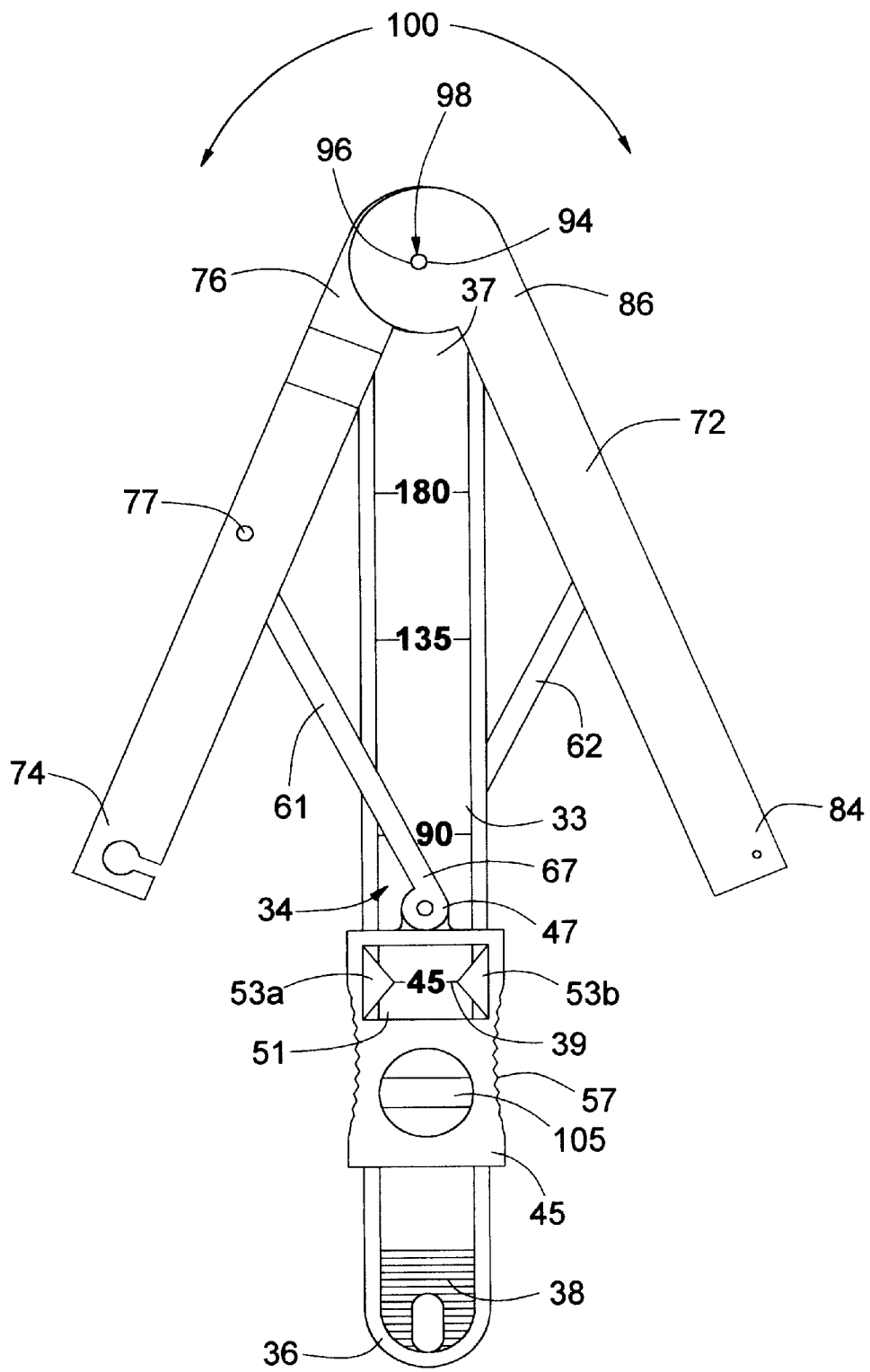
FIG. 4 is a plan view of an adjustable carpenter's square, according to an embodiment of the invention.
Figure 5:
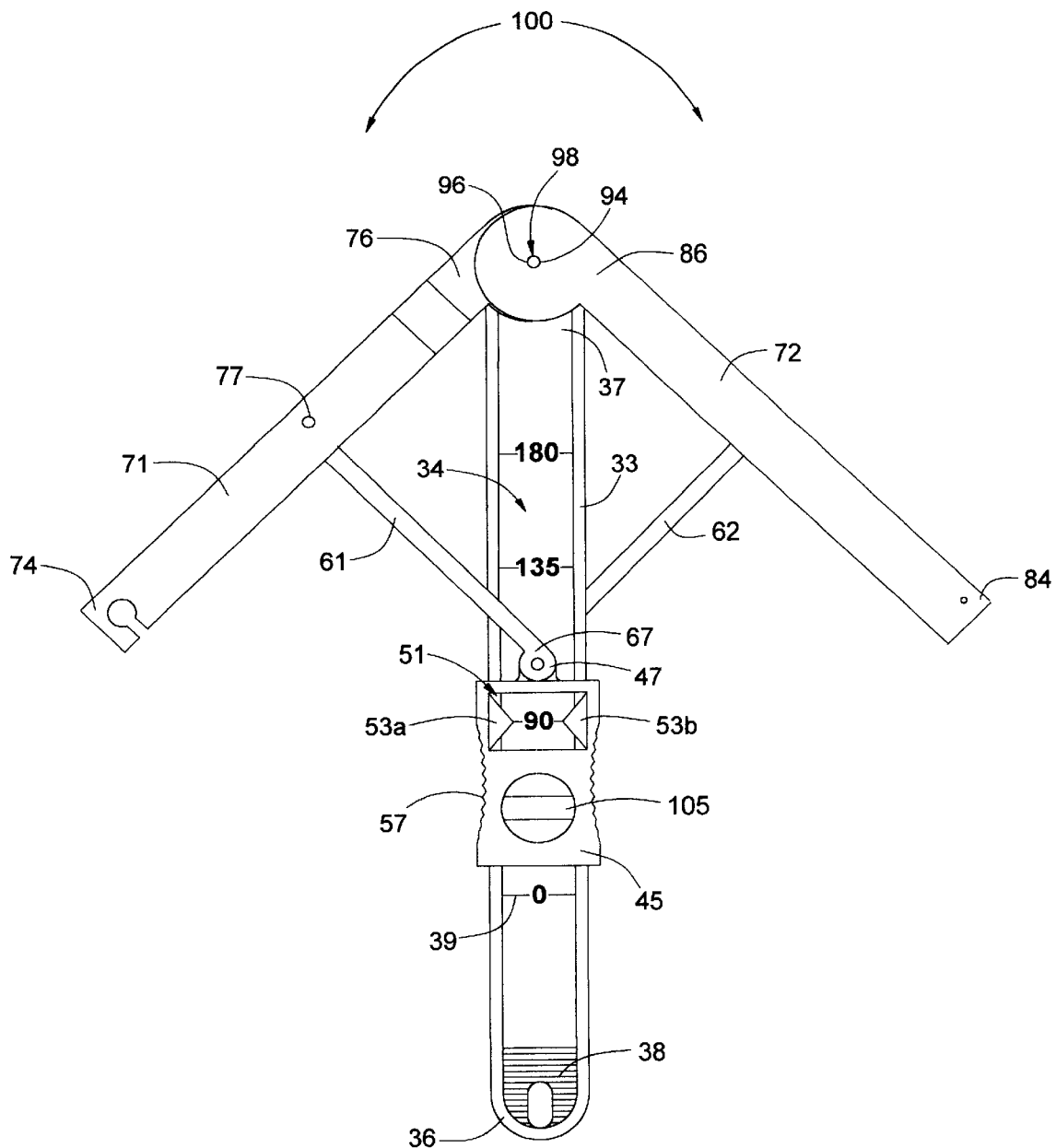
FIG. 5 is a plan view of an adjustable carpenter's square, according to an embodiment of the invention.

The indicator slide 45 controls, limits and coordinates the movement of the first wing 71 and the second wing 72, by use of the first strut 61 and the second strut 62, respectively. When the first wing and the second wing pivot about their respective first wing hinge 94 and second wing hinge 96, the first strut 61 and the second strut 62 preferably "nest" to contact the center bar 33. As shown in the series of FIGS. 3 through 7, the first strut and the second strut are preferably flat in form, to aid in the travel of the struts over the center bar. This nesting is especially important when the adjustable square is in the closed position, as shown in FIG. 3. The struts are preferably formed of a plastic material that is high in tensile strength, such as glass-filled 6/6 nylon, as employed to manufacture the other components of the adjustable square 30. However, alternate materials could be employed to form the first strut and the second strut, such as a stainless steel.

With the adjustable square 30 of the present invention, a "measured angle" 100 is formed between the first wing 71 and the second wing 72, with the first wing hinge 94 and the second wing hinge 96 together forming the vertex of the measured angle. The position of the indicator slide 45 on the center bar 33 is relatable to the measured angle by way of the angle indicia 39 displayed on the center bar. The indicator slide directly corresponds to the measured angle, as formed between the first wing and the second wing. Conversely, the indicator slide can be employed to select the measured angle desired to be formed between the first wing and the second wing.

As shown in FIG. 7, the adjustable square 30 can extend past the "flat" or 180° position shown in FIG. 6, to present measured angles 100 as would be found in an "outside" corner. For the purposes of description, these angles can be described as "negative." FIG. 7 shows a negative angle of 90°, as displayed in the top window 51 of the indicator slide. This is preferably the furthest extension possible with the indicator slide, because of the first strut 61 and the second strut 62 interference with the common wing pivot 98. However, with a small reconfiguration of the adjustable square, smaller negative angles could be obtained.

In a preferred alternative of the present invention, a user can lock the indicator slide 45 in any position along the center bar 33. The locked-in, measured angle 100 can then be translated and reproduced, as desired. Most preferably, to stop the movement of the indicator slide on any particularly desired angle indicia, the preferred embodiment of the present invention includes a slide lock 105, as detailed in FIGS. 12 and 13. The slide lock is preferably circular or a disc in shape and most preferably includes a knob 107 for gripping by the user. The slide lock also most preferably includes a ramp 108 that can engage against a reciprocal ramp 109, which is of a similar shape and formed within the indicator slide 45, as detailed in FIGS. 10 and 11. The slide lock is easily turned within the indicator slide by the user, and so engages and tightens against the center bar. This tightening prevents movement of the indicator slide along the center bar. When the ramped knob is tightened against the center bar, the adjustable square is locked in a desired position, corresponding to a selected angle indicia 39 and to a measured angle 100.

To employ the adjustable square 30 of the present invention, the user can quickly measure a particular angle. After placing the wing end 37 of the center bar 33 against the corner or center point of an object to be measured, the user can simply grab the thumb grip 38 with one hand and the indicator slide 45 with the other hand. By moving the indicator slide toward the wing end of the center bar, the wings will open with the first wing 71 separating from the second wing 72 and the center bar bisecting the measured angle 100, in between. When the wings are tight against the adjacent walls or the measured object's sides, the user can turn the slide lock 105 to lock the indicator slide in place and so prevent the first and second wings from further movement. The measured angle can now be read by noting the angle indicia 39 displayed within the top view window 51.

The adjustable square 30 can also be employed for scribing. The desired, measured angle 100 is fist selected ant the slide lock 105 turned to lock the first wing 71 and the second wing 72 immovably in the desired position. The first wing of adjustable square is employed to indicate the desired angle of cut. This gives the user the ability to scribe, using the ledge 90 on the second wing to brace against the material to be cut. The adjustable square can be held along the center bar as the user saws along the first wing. Most preferably, the desired angle is traced along the first wing and the line extended, if needed. Now the user can saw along the scribed line at the measured angle.

Additionally, the adjustable square can be employed as a compass. In a preferred embodiment of the present invention, the first wing includes a pencil holder 111, and the second wing includes a pin 112, as shown in FIG. 8. Because the ledge 90 is not needed for using the adjustable square as a compass, the adjustable square is most preferably employed for this purpose in an upside-down position, as shown in FIG. 9. The user places a pencil 113 in the pencil holder and pushes the pin to an extended position. The user then selects the measured angle 100 that results in the radius for the arc needed. Typically, the radius of the arc or circle to be marked is first scribed onto the surface that will receive the arc. A measuring tape or ruler can be employed for such a purpose.

Most preferably, the bottom face 35 of the center bar 33 includes "radius indicia" 116, similarly inscribed on the center bar as the angle indicia 39 of the top face 34. The radius indicia are any appropriate set of graduations upon the bottom face, which may, as most preferred, include numerical notations. The numerical notations correspond to units of length, preferably in inches or centimeters, but can be any units of linear measurement desired. As shown in FIG. 9, the radius indicia begin near the grip end 36 of the center bar and increase toward the wing end 37.

Figure 12:
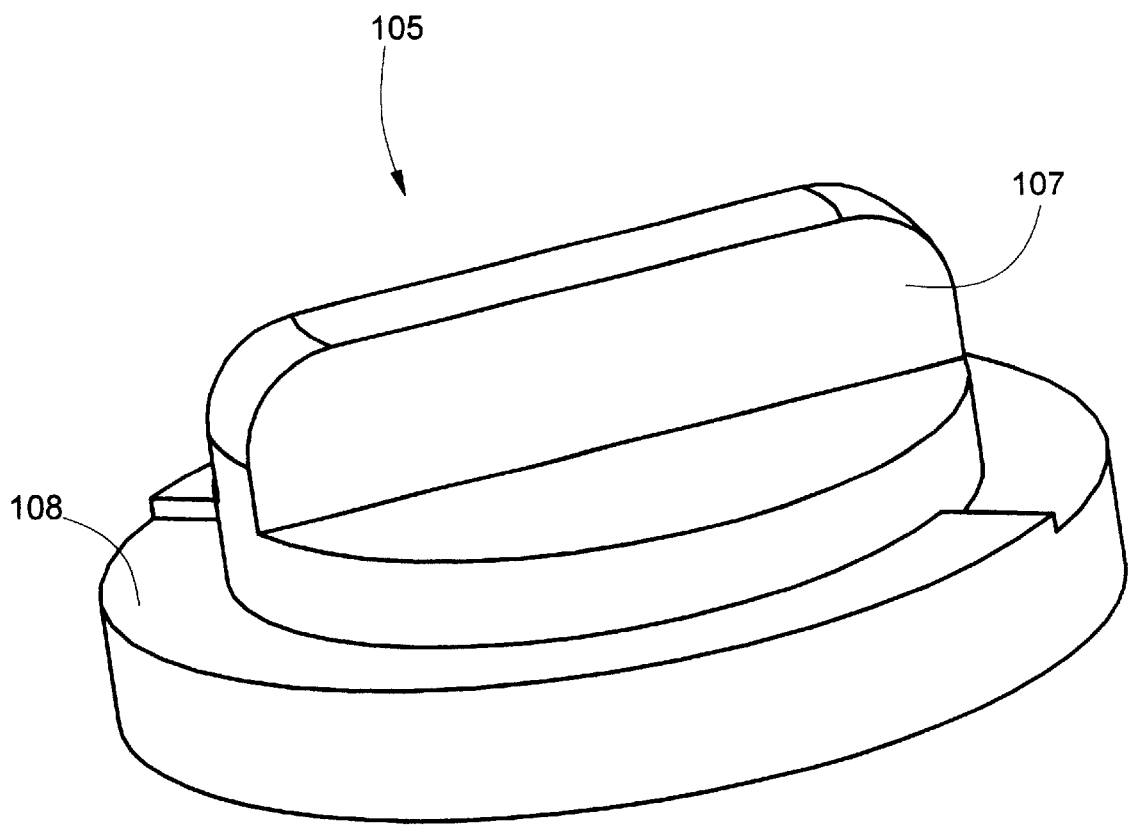
FIG. 12 is a perspective view of a portion of an adjustable carpenter's square, according to an embodiment of the invention.
Figure 13:
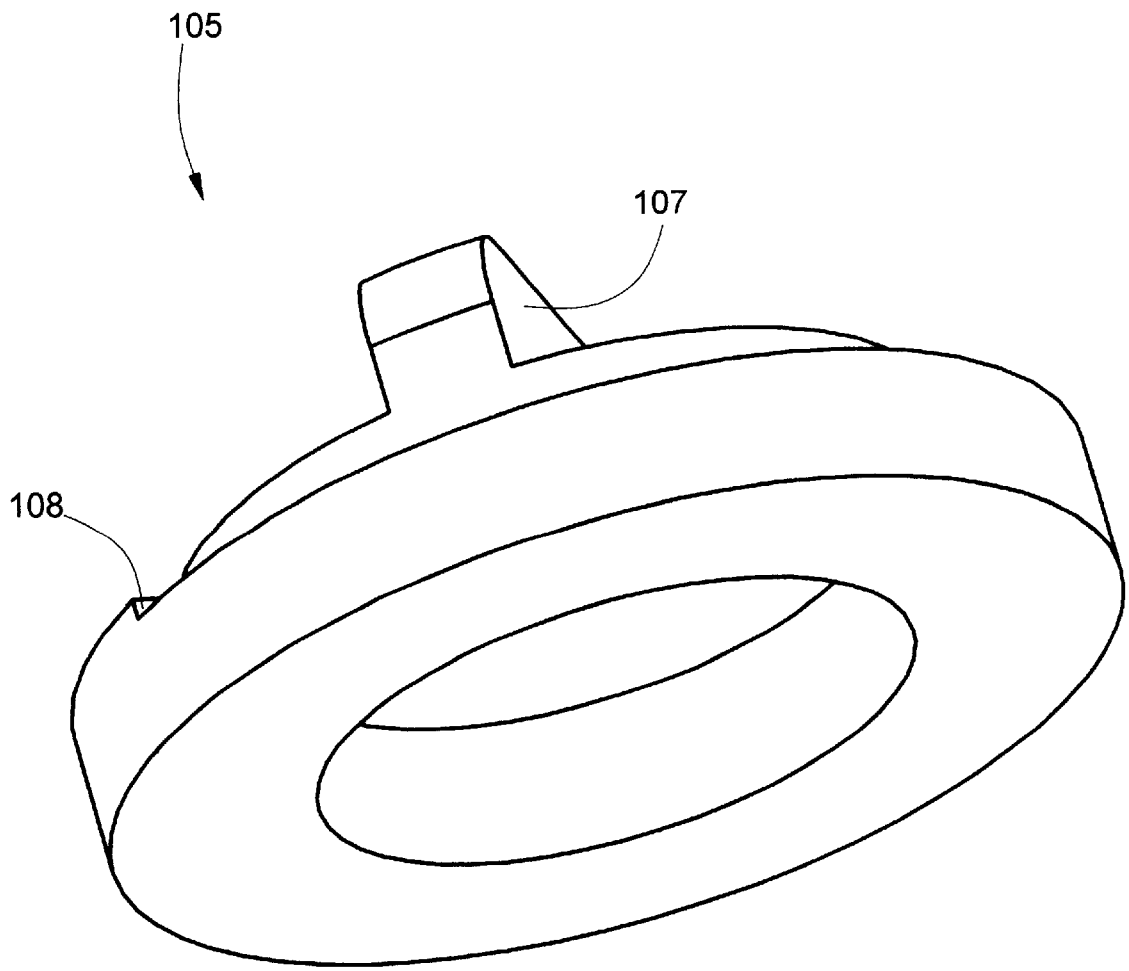
FIG. 13 is a perspective view of a portion of an adjustable carpenter's square, according to an embodiment of the invention.

The bottom view window 52 of the indicator slide 45 displays the radius indicia 116 on the bottom face 35 of the center bar 33, beneath. In a preferred embodiment, the bottom view window includes a bottom selection arrow 120. The selection arrow is a pointed extension of the indicator slide 45 into the bottom view window that gives the user precision in the selecting of the radius indicia 116 displayed within the bottom view window. Most preferably, as shown in FIGS. 8, 11 and 12 the selection arrow includes a first selection arrow 120a and a second selection arrow 120b, one each extending from opposite sides of the bottom view window. Alternatively, especially if the bottom view window includes a clear material, the selection arrow can be augmented or replaced by a selection line, a cross-hair, or some similar indicator. As an additional alternative, a digital, LED, or similar display could be employed instead of the bottom view window, to precisely indicate the position of the indicator slide on the center bar.

The distance between the pencil 113 and the pin 112 is the radius of a circle formed by rotating the adjustable square about the pin. This radius can be referred to as a "measured radius" 121, and is similar to the measured angle 100, in that the indicator slide 45 is positionable to correspond to a particular measured radius, just as the indicator slide is positionable to a particular measured angle.

The radius indicia 116 correspond to the radius of the circle constructed by rotating the pencil 113 in the first wing 71, about the pin 112 in the second wing 72. The pin is placed at the center of the desired arc, and the indicator slide 45 adjusted to place the pencil on the arc line at the bar. Also alternatively, the angular indicia can solely include pitch information instead of angles in degrees.

The distance between the pencil 113 and the pin 112 is the radius of a circle formed by rotating the adjustable square about the pin. This radius can be referred to as a "measured radius" 121, and is similar to the measured angle 100, in that the indicator slide 45 is positionable to correspond to a particular measured radius, just as the indicator slide is positionable to a particular measured angle.

The radius indicia 116 correspond to the radius of the circle constructed by rotating the pencil 113 in the first wing 71, about the pin 112 in the second wing 72. The pin is placed at the center of the desired arc, and the indicator slide 45 adjusted to place the pencil on the arc line at the desired radius, as independently measured, or as the measured radius 121, preferably indicated in the bottom window 52 of the indicator slide. The slide lock 105 is then turned to lock the indicator slide in place and the circular arc drawn by rotating the adjustable square 30 about the pin.

The adjustable square 30 can also be employed for a "notch-out." Again, the pencil 113 is placed into the pencil holder, but with the adjustable square in the regular position, as shown in FIG. 8. Using a ruler or tape measure, the distance from the edge of a surface to be cut is marked. Preferably, the radius indicia 116 on the bottom face 35 of the center bar 33 are employed instead. This eliminates the need for external measuring devices. Then, the pencil within the pencil holder is placed on the mark, as the ledge 90 is held against the edge of the surface. The slide lock 105 is then turned to lock the adjustable square in the desired position. The adjustable square is then slid along the edge of the material, which draws a line with the pencil parallel to the edge of the material, to the length needed.

Additionally, the adjustable square 30 of the present invention can be employed to find the center of a circle. For alternative use of the adjustable square, the center bar 33, preferably includes a grip hole 116, near the grip end 36 of the center bar. Additionally the center bar preferably includes a wing hole 117, preferably near the wing end 37 of the center bar. These additional holes are shown in FIGS. 8 and 9. The indicator slide 45 is adjusted so that the first wing 71 and the second wing 72 are closed to the perimeter of the circle of unknown center, preferably with the adjustable square in the upside-down position, as shown in FIG. 9. Alternatively, the first wing and the second wing can be opened to the perimeter of the circle. The user then makes a mark, or scribes a dot, in both the grip hole 116 and the wing hole 117 of the center bar. With a ruler or a straight edge on the adjustable square, a straight first line is drawn from one of these points, just set, to the other. Repeat this process at a line approximately perpendicular to the first line to scribe a second line. The intersection of these two lines is the center of the circle.

For larger circles having an unknown center, the pencil 113 of the first wing, can be placed on one perimeter of the circle. Then the pin 112 of the second wing, is placed on another perimeter line of the circle. The user then makes a mark, or scribes a dot, inside both the grip hole 116 and the wing hole 117, of the center bar. With a ruler or a straight edge on the adjustable square, a straight first line is drawn from one of these points just scribed, to the other. Repeat this process at a line approximately perpendicular to the first line to scribe a second line. The intersection of these two lines is the center of the circle.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. An adjustable carpenter's square comprising:
   a center bar, the center bar having a grip end, a wing end and a set of indicia, a first wing, the first wing having a first wing tip, and a first center bar end;

a second wing, the second wing having a second wing tip, and a second center bar end;

a measured relation formed by and in relation to the first wing with the second wing;

a first wing hinge for pivotably connecting the first wing to the center bar, the first wing hinge proximate to the first center bar end of the first wing, and the first wing hinge proximate to the wing end of the center bar;

a second wing hinge for pivotably connecting the second wing to the center bar, the second wing hinge proximate to the second center bar end of the second wing, and the second wing hinge proximate to the wing end of the center bar;

a first strut having a first wing strut end and a first slide strut end;

the first wing including a first wing strut pivot positioned between the first wing tip and the first wing hinge end, the first wing strut pivot for hingably connecting the first wing to, the first strut, and the first wing strut pivot attached to the first strut proximate to the first wing strut end of the first strut;

a second strut having a second wing strut end and a second slide strut end;

the second wing including a second wing strut pivot positioned between the second wing tip and the second wing hinge end, the second wing strut pivot for hingably connecting the second wing to the second strut, the second wing strut pivot attached to the second strut proximate to the second wing strut end of the second strut; and an indicator slide receivable onto the center bar, the indicator slide including a top view window, the indicator slide including a first slide strut pivot and a second slide strut pivot, the first slide strut pivot on the indicator slide connected to the first strut proximate to the first slide strut end of the first strut, the second slide strut pivot on the indicator slide connected to the second strut proximate to the second slide strut end of the second strut, the indicator slide lockable into a position on the center bar with a slide lock to retain the first wing in relation to the second wing and to maintain the measured relation between the first wing and the second wing, the indicator slide lockable from the same side of the indicator slide as the top view window;

the indicator slide including a slide lock, the slide lock including a ramp, the ramp engagable against a reciprocal ramp, the reciprical ramp similar in shape to the ramp, the reciprocal ramp formed within the indicator slide, and the slide lock turnable within the indicator slide to engage and tighten against the center bar; and the position of the indicator slide relatable by way of the set of indicia displayed on the center bar through the top view window, to the measured relation between the first wing and the second wing.

2. The adjustable carpenter's square of the claim 1, wherein:

the set of indicia includes a plurality of angle values; and the measured relation is an angle measured in degrees.

3. The adjustable carpenter's square of the claim 1, wherein:

the set of indicia includes a plurality of radius values; and the measured relation is a radius measured in units of length.

4. The adjustable carpenter's square of the claim 1, wherein:

the indicator slide is positionable along the center bar to select one of the set of indicia.

5. The adjustable carpenter's square of the claim 2, wherein:

the indicator slide is positionable along the center bar to select one of the plurality of radius values.

6. The adjustable carpenter's square of the claim 1, wherein:

the indicator slide is positionable along the center bar to select one of the set of indicia within the top view window.

7. The adjustable carpenter's square of the claim 2, wherein:

the indicator slide includes a bottom view window, the indicator slide positionable along the center bar to select one of a set of indicia values within the bottom view window.

8. The adjustable carpenter's square of the claim 3, wherein:

the indicator slide is positionable along the center bar to select one of the radius values within the bottom view window.

9. The adjustable carpenter's square of the claim 1, wherein the center bar bisects the measured angle.

10. The adjustable carpenter's square of the claim 1, wherein the indicator slide includes a top side and a bottom side, and the first slide strut pivot attaches on the top side and the second slide strut pivot attaches on the bottom side of the indicator slide.

11. An adjustable carpenter's square comprising:

a center bar, the center bar having a set of angle indicia, the set of angle indicia including a plurality of angle values;

a indicator slide receivable onto the center bar, the indicator slide having a top side and a bottom side, and the indicator slide including a fist slide strut pivot on the top side and a second slide strut pivot on the bottom side;

a first wing, the first wing having a first wing tip, and a first center bar end;

a second wing, the second wing-having a second wing tip, and a second center bar end;

a measured angle formed by an intersection with the first wing together with the second wing;

a first wing hinge for pivotably connecting the first wing to the center bar, the first wing hinge proximate to the first center bar end of the first wing, and the first wing hinge proximate to the wing end of the center bar;

a second wing hinge for pivotably connecting the second wing to the center bar, the second wing hinge proximate to the second center bar end of the second wing, and the second wing hinge proximate to the wing end of the center bar;

a first strut having a first wing strut end and a first slide strut end;

the first wing including a first wing strut pivot positioned between the first wing tip and the first wing hinge end, the first wing strut pivot for hingably connecting the first wing to the first strut, the first wing strut pivot attached to the first strut proximate to the first wing strut end of the first strut;

a second strut having a second wing strut end and a second slide strut end;

the second wing including a second wing strut pivot positioned between the second wing tip and the second wing hinge end, the second wing strut pivot for hingably connecting the second wing to the second strut, the second wing strut pivot attached to the second strut proximate to the second wing strut end of the second strut;

the first slide strut pivot on the indicator slide connected to the first strut proximate to the first slide strut end of the first strut;

the second slide strut pivot on the indicator slide connected to the second strut proximate to the second slide strut end of the second strut;

the indicator slide including a slide lock, the slide lock including a ramp, the ramp engagable against a reciprocal ramp, the reciprical ramp similar in shape to the ramp, the reciprocal ramp formed within the indicator slide, and the slide lock turnable within the indicator slide to engage and tighten against the center bar; and the position of the indicator slide on the center bar relatable by way of the plurality of angle values displayed on the center bar, to the measured angle between the first wing and the second wing.

12. An adjustable carpenter's square comprising:

a center bar, the center bar having a set of radius indicia, the set of radius indicia including a plurality of radius values;

a indicator slide receivable onto the center bar, the indicator slide including a first slide strut pivot and a second slide strut pivot;

a first wing, the first wing having a first wing tip, and a first center bar end;

a pencil holder located proximate the first wing tip of the first wing;

a second wing, the second wing having a second wing tip, and a second center bar end;

a center pin located proximate the second wing tip of the second wing;

a measured radius formed between the pencil holder at the first wing tip and the center pin at the second wing tip;

a first wing hinge for pivotably connecting the first wing to the center bar, the first wing hinge proximate to the first center bar end of the first wing, and the first wing hinge proximate to the wing end of the center bar;

a second wing hinge for pivotably connecting the second wing to the center bar, the second wing hinge proximate to the second center bar end of the second wing, and the second wing hinge proximate to the wing end of the center bar;

a first strut having a first wing strut end and a first slide strut end;

the first wing including a first wing strut pivot positioned between the first wing tip and the first wing hinge end, the first wing strut pivot for hingably connecting the first wing to the first strut, the first wing strut pivot attached to the first strut proximate to the first wing strut end of the first strut;

a second strut having a second wing strut end and a second slide strut end;

the second wing including a second wing strut pivot positioned between the second wing tip and the second wing hinge end, the second wing strut pivot for hingably connecting the second wing to the second strut, the second wing strut pivot attached to the second strut proximate to the second wing strut end of the second strut;

the first slide strut pivot on the indicator slide connected to the first strut proximate to the first slide strut end of the first strut;

the second slide strut pivot on the indicator slide connected to the second strut proximate to the second slide strut end of the second strut;

the indicator slide including a slide lock, the slide lock including a ramp, the ramp engagable against a reciprocal ramp, the reciprical ramp similar in shape to the ramp, the reciprocal ramp formed within the indicator slide, and the slide lock turnable within the indicator slide to engage and tighten against the center bar; and the position of the indicator slide on the center bar relatable by way of the plurality of radius values displayed on the center bar, to the measured radius between the pencil holder and the center pin.

* * * * *